Feb. 28, 1933.   R. R. BOTTOMS   1,899,409
BUBBLE TOWER
Filed Aug. 14, 1931   2 Sheets-Sheet 1

INVENTOR
*Robert Roger Bottoms*
BY
ATTORNEYS

Feb. 28, 1933.      R. R. BOTTOMS      1,899,409
BUBBLE TOWER
Filed Aug. 14, 1931      2 Sheets-Sheet 2
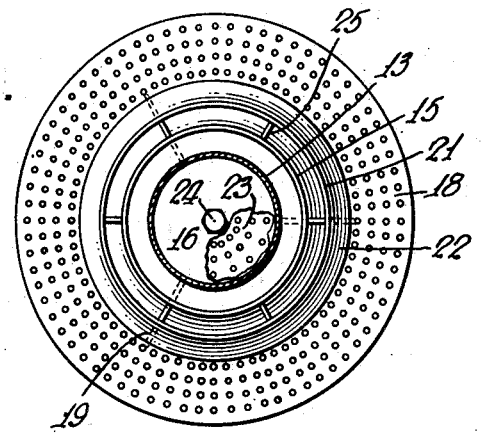
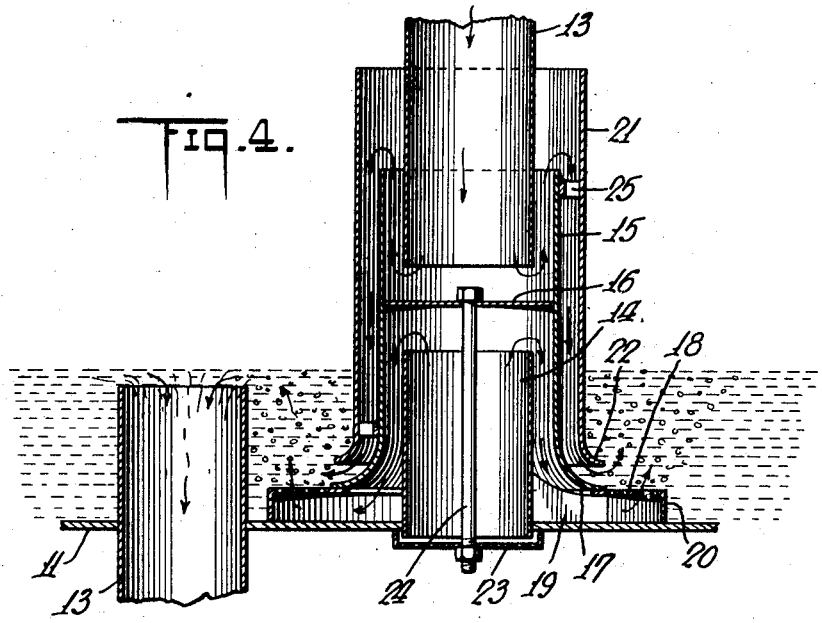
INVENTOR
Robert Roger Bottoms
BY
ATTORNEYS Patented Feb. 28, 1933

1,899,409

UNITED STATES PATENT OFFICE

ROBERT ROGER BOTTOMS, OF LOUISVILLE, KENTUCKY, ASSIGNOR TO THE GIRDLER CORPORATION, OF LOUISVILLE, KENTUCKY, A CORPORATION OF DELAWARE

BUBBLE TOWER

Application filed August 14, 1931. Serial No. 556,957.

The invention relates to apparatus for effecting intimate contact between downflowing liquids and upflowing gases or vapors by bubbling the gases through the liquid. An apparatus of this type commonly comprises an outer vertical shell subdivided by a series of horizontally disposed partition plates to form intermediate compartments, the plates being provided with liquid overflow pipes for the flow of the liquid from one compartment to the next lower one, and means to cause the ascending gases to bubble through the liquid in each compartment as said gases flow upwardly from one compartment to the next higher one.

One object of the present invention is to provide a new and improved bubble cap for effecting more intimate contact between the gases and the liquid.

Another object is to provide a new and improved bubble cap which causes the gas entering the liquid in each compartment to come into contact with the liquid at the point where the liquid enters from the compartment above, so that there will be the most effective action.

Another object is to provide a bubble cap which creates substantially horizontally directed liquid currents at a point where the gas bubbles pass substantially vertically through the liquid, these currents serving to continually bring fresh liquid to the entering gas, the most effective contact and action between the gases and the liquid being thus secured.

Other advantages and objects will be pointed out hereinafter or will be apparent from the following description and the accompanying drawings.

In the drawings, there is shown, for purposes of illustration, one embodiment of the present invention, in which Fig. 1 is a top plan view of the bubble tower with the crown sheet of the enclosing shell removed to show the interior of said tower.

Fig. 3 is a top plan view of a bubble cap on a larger scale, and

Fig. 4 is a vertical section taken through one unit including a bubble cap and a cooperating overflow pipe.

Figure 1:
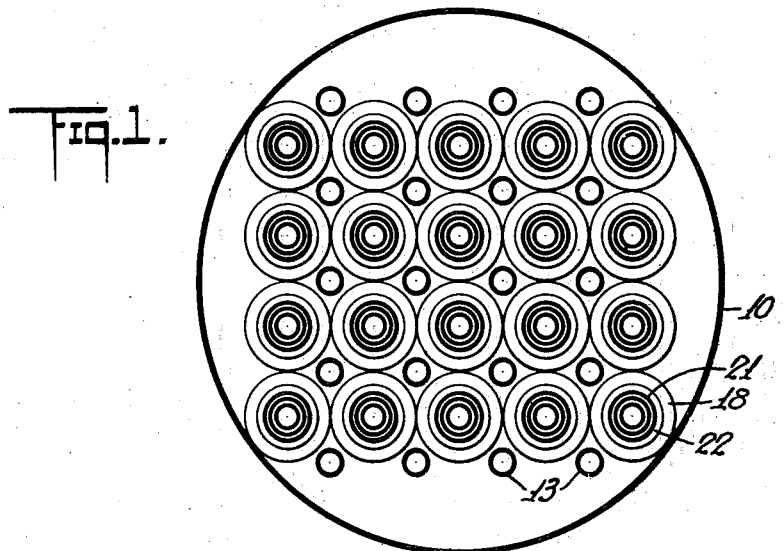
Figure 2:
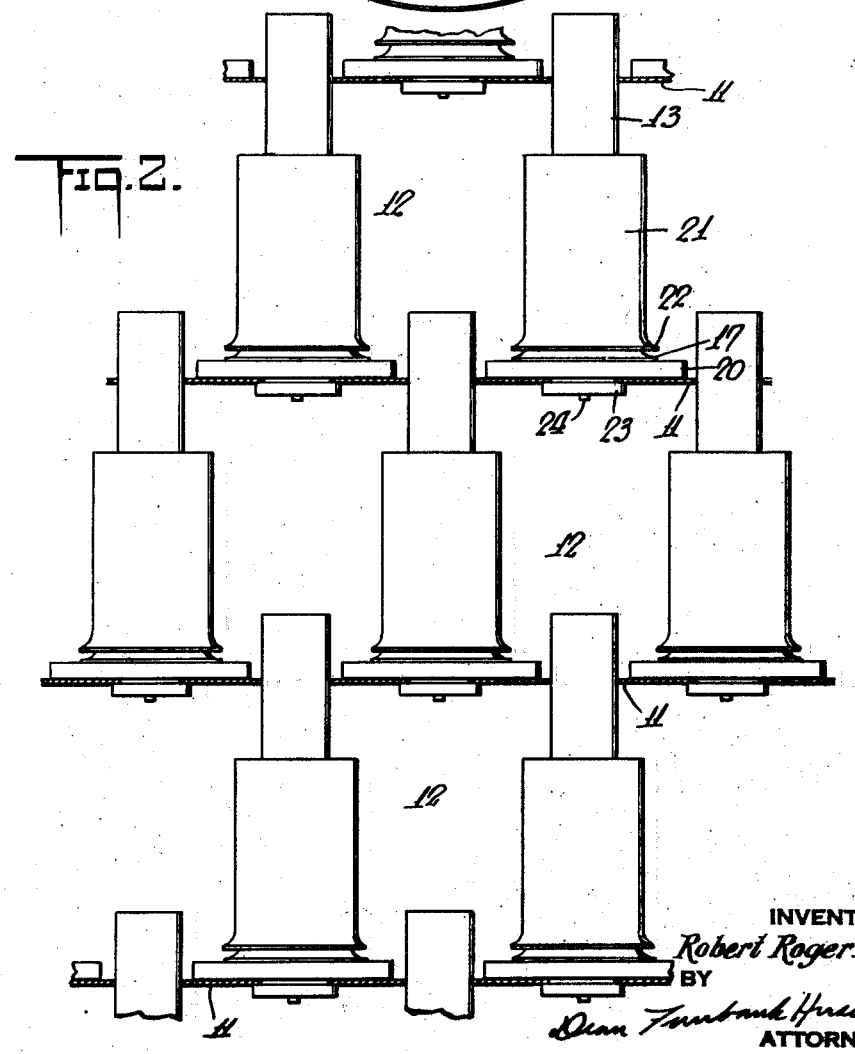
Fig. 2 is a side elevation of part of the apparatus, partly in section, and showing the arrangement of the bubble caps and the overflow pipes of the various compartments.

In the specific embodiment of the present invention, there is provided an outer vertical shell 10 in which are arranged a series of superposed partition plates 11 disposed at predetermined distances apart to form a plurality of superposed compartments 12. The gas, vapor or other gaseous medium is delivered or produced at the lower part of the tower, and the liquid is introduced or formed by condensation at the upper part in the usual or any suitable manner.

In order to pass the liquid successively from one compartment to the other, each partition plate has passing therethrough a plurality of overflow pipes 13, each having an upper portion thereof extending above a plate 11 to maintain the desired liquid level above the plate, and a lower portion leading to a bubble cap in the next lower compartment. Each plate 11 is adapted to support a plurality of such bubble caps disposed in alignment with the overflow pipes of the next higher compartment. In this manner, the bubble caps of one compartment will be arranged in staggered relationship with the bubble caps of the compartments above and below, thereby effecting a compact arrangement.

Each bubble cap includes a gas pipe 14 extending up from a perforation in the plate and over this is a cap formed by a pipe 15 concentric with and spaced from the pipe 14 and having a transverse partition 16 spaced from the upper end of the pipe 14. The lower end of the pipe 15 projects below the liquid level maintained on the plate and may have a flared terminal flange 17. This end portion is secured to an annular perforated plate 18 spaced a short distance above the plate 11. The plate 18 may, if desired, be supported from the plate 11 by webs or brackets 19 and the periphery of the space beneath the perforated plate may be closed by an annular flange or ring 20.

Concentrically mounted with respect to said tube 15 and encircling the same in spaced relationship is a tube 21, the lower end of which may have a flared portion 22 below the liquid level and extending radially above the flange 17 to form an annular liquid nozzle directed across the upper surface of the perforated plate 18.

The overflow pipe 13 of one plate is in axial alignment with the gas flow pipe 14 of the plate below and projects into the open upper end of the pipe 15. Thus the pipe 15 has its upper part above the partition 16 serving as a cup and liquid seal to prevent upflow of gas in the pipe 13 and its lower part serving as a bell to prevent the downflow of gas in the pipe 14. The partition 16 also serves to support a screen plate 23 in position through the agency of a bolt 24 passing therebetween.

The tube 21 may be supported by a series of spacing members 25 and the upper end extends a substantial distance above the upper end of the tube 15.

In the operation of the construction shown, the liquid is introduced or condensed at the upper part of the tower, and as the level of this liquid reaches a predetermined height above the plate 11, the liquid overflows into the overflow pipe 13, fills the cup, overflows the edge of the latter, passes between the pipes 15 and 21, and is discharged through the annular nozzle at the lower end of these pipes into the lower compartment. When the liquid above the plate in said latter compartment has similarly reached a predetermined level, the flow continues to the next lower plate. The liquid thereby flows successively from one compartment to the next. At the same time, gas or vapor under pressure is introduced or produced at the lower part of the tower and passes through the screen plate 23 of the bubble cap mounted in the lower plate, and flows upwardly through the gas tube 14 into the bell and from the lower edge of the bell, into the space beneath the perforated plate 18 and up through the perforations thereof directly into the liquid entering the chamber through the annular, horizontally directed nozzle.

In towers or columns used for the rectification of volatile fluids of different boiling points, the top plate will contain the mixture having the minimum percentage of the constituent of highest boiling point, and the bottom plate will contain the mixture having the minimum percentage of the constituent of lowest boiling point. Similarly, if the tower be used for absorption purposes, the percentage of the absorbed or adsorbed gaseous medium in the liquid or chemically united with a constituent thereof, will increase as the liquid approaches the bottom of the tower.

Therefore the liquid as it is delivered to each compartment will have a lesser amount of the gaseous medium or constituent of lower boiling point than does the remainder of the liquid in that compartment. Furthermore the gas as it enters each compartment from beneath the bell will have a higher percentage of absorbable constituent or a higher percentage of the constituent of lowest boiling point than does the gas leaving the same compartment.

As one important advantage of my improved apparatus the gas and the liquid enter each compartment at closely juxtaposed points so that the gas bubbles up through the liquid which is more absorbent of the gas or of the lower boiling constituent than is the remainder of the liquid in that compartment. Thus the gas and liquid are brought together in each compartment when under conditions which insure the maximum of the desirable action, namely, the absorption, adsorption or condensation of the maximum amount of the constituent of highest boiling point in the gaseous medium, or the one which is acted on to the greatest extent by the liquid.

As the stream of liquid is discharged directly across the perforated bubble ring, the liquid, by reason of its velocity, has a tendency to remove the bubbles from the top of the ring as fast as they are formed at the upper ends of the perforations and thus prevents the bubbles from adhering to the plate until they grow to any appreciable size. Thus the apparatus has a tendency to produce a greater number of small bubbles for any given size of perforations and pressure of gas.

Having thus described my invention, what I claim as new and desire to secure by Letters Patent is:

1. A bubble tower including two superposed spaced plates for supporting separate spaced layers of liquid, a liquid overflow pipe depending from the upper plate, a gas inlet pipe extending up from the lower plate, said pipes being in axial alignment but spaced apart, a cup enclosing the lower end of the first mentioned pipe and forming a liquid seal to prevent upflow of gas through said pipe, a bell enclosing the upper end of the second mentioned pipe and having the top thereof spaced below the lower end of said first mentioned pipe to prevent downflow of liquid from said latter pipe through said second mentioned pipe, and means for delivering the gas from said bell and the liquid overflowing from said cup at superposed spaced outlets, the gas being delivered at the lower of said outlets.

2. A bubble tower including two superposed spaced plates for supporting separate spaced layers of liquid, a liquid overflow pipe depending from the upper plate, a gas inlet pipe extending up from the lower plate, said pipes being in axial alignment but spaced apart, and a third pipe encircling said overflow and gas inlet pipes and having its upper and lower ends spaced from said plates, said third pipe having a transverse partition between said first and second mentioned pipes, whereby the upper end provides a liquid seal for the lower end of the first mentioned pipe and the lower end provides a bell for the upper end of the second mentioned pipe.

3. A bubble tower including two superposed spaced plates for supporting separate spaced layers of liquid, a liquid overflow pipe depending from the upper plate, a gas inlet pipe extending up from the lower plate, said pipes being in axial alignment but spaced apart, and a pair of concentrically spaced pipes encircling the first mentioned pipes and having their lower ends spaced apart and flared to provide an annular, horizontally directed nozzle, the outer of said concentric pipes extending to a higher elevation than the inner of said concentric pipes, whereby liquid from said overflow pipe flows downwardly between said concentric pipes and the inner of said concentric pipes being spaced from the plate therebelow to form an outlet for gas entering through said gas inlet pipe, whereby said gas passes directly upwardly into the stream of liquid delivered by said nozzle.

4. A bubble tower including two superposed spaced plates for supporting separate layers of liquid, a gas inlet pipe extending up from the lower pipe, a bell over the upper end of said pipe and having an outwardly flared lower end, an annular perforated plate connected to said lower end, and means for delivering liquid from the plate above exteriorly of said bell and approximately horizontally from said flared end across said perforated plate.

5. A bubble tower including a pair of interspaced superposed partition plates, each adapted to support a body of liquid, a bubble cap mounted on the bottom plate, an overflow pipe having a portion thereof extending above the upper plate, and the lower portion extending into said bubble cap, said bubble cap including an annular foraminated plate, means for delivering gases to the underside of said plate for passage upwardly through the perforations thereof, an annular nozzle disposed above said plate for discharging liquid radially outwardly across the face of said plate, and means for directing the overflow of liquid from the upper partition plate to said nozzle.

6. A bubble tower including a pair of interspaced superposed plates, each adapted to support a body of liquid, a bubble cap mounted on the bottom plate, an overflow pipe extending down from the upper plate and having the lower portion extending into said bubble cap, said bubble cap including a foraminated plate extending substantially in a horizontal direction, means for delivering gases below said plate for passage upwardly through the perforations thereof, a vertically extending conduit radially spaced from said overflow pipe and having the upper end thereof open and extending above the lower end of said overflow pipe, and having the lower end thereof open and disposed adjacent to said foraminated plate, and means for directing the liquid from the upper end of said conduit to said foraminated plate and across the upper surface of the latter.

7. A contact apparatus of the bubble cap type, including a plate having means for limiting the maximum level of liquid supported thereon, a passage for the upflow of the gas through the plate, and having an annular outlet for delivering the gas below the liquid level on the plate, and an annular nozzle for delivering liquid in an approximately horizontal stream radially from said nozzle, and directly above said annular gas outlet.

8. A bubble apparatus, including an inverted cap, means for delivering a gas beneath the cap, and a liquid conduit larger than the cap and enclosing the same, said conduit having an annular, substantially horizontally directed outlet facing radially away from the cap around the periphery thereof, and adjacent to but above the lower end of the latter.

9. A bubble apparatus including an inverted cap, means for delivering a gas beneath the cap, and a liquid conduit having an annular, substantially horizontally directed outlet facing radially away from the cap around the periphery thereof, and adjacent to but above the lower end of the latter.

10. A bubble tower including a liquid compartment, a vertical conduit for delivering liquid to said compartment, and having an annular outlet below the level of liquid in said compartment, said outlet including a flared flange forming the lower wall thereof and extending substantially horizontally to direct liquid from said conduit horizontally in said compartment, a perforated plate beneath said outlet forming an extension of said flange, and means for delivering gas to said compartment directly beneath said perforated plate, whereby it passes upwardly through said perforated plate directly into the stream emerging from said outlet.

11. A contact apparatus of the bubble type, including a liquid compartment, means for delivering liquid to said compartment, and including a pair of vertically extending tubular members, one encircling the other to permit the liquid to flow downwardly, between said members, the inner member having the lower end thereof extending below the liquid level in said compartment, and terminating in an annular flared flange extending substantially horizontally for directing liquid in a horizontal direction, a perforated plate closely adjacent to said flange and extending outwardly therefrom, and means for delivering gas to said compartment beneath said perforated plate, whereby it flows through said plate directly into the liquid directed by said flange.

12. A contact apparatus of the bubble type, including a pair of vertically spaced upper and lower liquid supporting plates, a passage for the overflow of liquid from the upper plate, means preventing the upflow of gas through said passage, and a passage for the upflow of gas from below the lower plate, means for preventing downflow of liquid through said last mentioned passage, said passages being disposed in substantial axial alinement, means for delivering liquid from said first mentioned passage in an approximately horizontal stream below the liquid level in the lower plate, and means for delivering the gas from the second mentioned passage directly beneath the stream.

13. A bubble tower including a liquid compartment, a vertical conduit for delivering liquid to said compartment, and having an annular outlet below the level of the liquid in said compartment, said outlet having the bounding walls thereof extending in a direction to project a stream of liquid directly from said outlet in a substantially horizontal direction in said compartment, a perforated plate directly beneath said outlet and contiguous to the lower of said walls, and a passage for delivering gas from below said compartment into the latter through said perforated plate and directly into the stream emerging from said outlet, a portion of said passage being above the liquid level in said compartment to form a seal.

Signed at Louisville, in the county of Jefferson and State of Kentucky, this 6th day of August, A. D. 1931.

ROBERT ROGER BOTTOMS.